United States Patent [19]

Iwata

[11] Patent Number: 4,568,067
[45] Date of Patent: Feb. 4, 1986

[54] STRUT SUSPENSION FOR AN AUTOMOTIVE VEHICLE

[75] Inventor: Kazuroh Iwata, Zushi, Japan

[73] Assignee: Nissan Motor Company, Limited, Yokohama, Japan

[21] Appl. No.: 531,508

[22] Filed: Sep. 12, 1983

[30] Foreign Application Priority Data

Sep. 14, 1982 [JP] Japan .................................. 57-160574
Jan. 31, 1983 [JP] Japan ............................. 58-12222[U]

[51] Int. Cl.⁴ .......................... B60G 7/02; B60G 15/06
[52] U.S. Cl. .................................... 267/8 R; 267/28; 267/30; 267/33; 267/60
[58] Field of Search .............. 267/8 R, 8 B, 8 C, 8 D, 267/8 A, 30, 31, 28, 33, 35, 34, 32, 29, 22 A, 24, 22 R, 23, 63, 64.15, 60–62, 151–153, 140.2, 140.1, 141, 140; 188/322.11; 321.11; 280/668, 662, 697; 180/89.14, 89.15

[56] References Cited

U.S. PATENT DOCUMENTS

| | | | |
|---|---|---|---|
| 1,332,915 | 3/1920 | Munson | 188/321.11 |
| 2,468,939 | 5/1949 | Mercier | 188/321.11 |
| 3,157,392 | 11/1964 | Kitamura | 267/60 X |
| 3,346,272 | 10/1967 | Smith | 280/668 |
| 3,368,824 | 2/1967 | Julien | 267/34 |
| 3,561,747 | 2/1971 | Donnelly | 267/161 |
| 4,200,307 | 4/1980 | Szabo | 280/668 |

FOREIGN PATENT DOCUMENTS

| | | |
|---|---|---|
| 1571657 | 5/1969 | France . |
| 2229566 | 12/1974 | France . |
| 2259711 | 8/1975 | France . |
| 2471873 | 6/1981 | France . |
| 53-124825 | 10/1978 | Japan . |
| 1245658 | 9/1971 | United Kingdom . |
| 1468907 | 3/1977 | United Kingdom . |

*Primary Examiner*—Douglas C. Butler
*Attorney, Agent, or Firm*—Leydig, Voit & Mayer

[57] ABSTRACT

A shock-absorbing strut suspension for an automotive vehicle includes a disc spring between the strut and the vehicle body. The disc spring is pre-loaded upon assembly in the vehicle so that it readily absorbs small-amplitude vibrations while transmitting larger-amplitude vibrations. The disc spring thus augments the effect of elastic dampers designed to absorb high-frequency, relative low-amplitude vibrations.

15 Claims, 14 Drawing Figures

STRUT SUSPENSION FOR AN AUTOMOTIVE VEHICLE

BACKGROUND OF THE INVENTION

The present invention relates generally to a strut type suspension for an automotive vehicle, which is adapted to successfully prevent transmission of vibration or mechanical displacement between a wheel axle and a vehicle body. More specifically, the invention relates to a strut-type suspension which can prevent transmission of not only relatively low-frequency vibrations but also relatively high-frequency vibration.

In general, a strut-type suspension absorbs relative displacements between a wheel axle and a vehicle body so as to prevent transmission of vibrations, road shocks and so forth. The strut suspension generally includes a shock absorber for damping relative displacements between the wheel axle and the vehicle body. However, the shock absorber will not work successfully and satisfactory for relatively small-amplitude, high-frequency mechanical vibrations of the wheel axle or the vehicle body. Such short-stroke vibrations are absorbed by an elastic damper inserted between a strut assembly and the vehicle body. If such an elastic damper is relatively hard, suspension will be relatively rigid and so produce a relatively higher damping force for absorbing short-stroke vibrations. Such a hard elastic damper is good for damping relatively low-frequency vibrations to provide good driving stability but will give a rough ride. In addition, such a hard elastic damper will not adequately eliminate relatively high-frequency vibrations. In turn, when a relatively soft elastic damper is used, high-frequency vibrations will be successfully eliminated so that transmission of such high-frequency vibrations will be prevented. However, such a soft elastic damper will encounter a problem with respect to damping of relatively low-frequency vibrations which degrades driving stability and steering characteristics.

If an elastic damper such as a rubber bushing is designed for damping not only relatively low-frequency vibrations but also relatively high-frequency vibrations, the size of the damper has to be so large as to make same unsuitable for the strut assembly. Furthermore, in the case of a relatively soft elastic damper, the damper will be worn out in a relatively short period of time due to the relatively large deformations caused by every displacement cycle.

Therefore, in the prior art, it has been impossible, in practice, to achieve a damping effect sufficient to successfully and satisfactorily prevent transmission of vibrations due to mechanical displacements between the wheel axle and the vehicle body.

SUMMARY OF THE INVENTION

Therefore, it is an object of the present invention to provide a strut-type suspension which can successfully prevent transmission not only of relatively low-frequency vibrations but also of relatively high-frequency vibrations.

More specific object of the invention is to provide a strut-type suspension which includes an elastic damper for damping relatively short-stroke mechanical vibrations and which is effective both for relatively low-frequency vibrations and high-frequency vibrations.

To accomplish the foregoing and other objects, a strut-type suspension, according to the present invention, includes a pre-stressed spring member as a damper, which is adapted to prevent transmission of relatively high-frequency, low-amplitude vibrations. The pre-stressed spring is interposed between a suspension strut assembly and a vehicle body so as to absorb the relative displacement between the suspension strut and the vehicle body and so absorb the vibrations therebetween.

BRIEF DESCRIPTION OF THE DRAWINGS

The present invention will be understood more fully from the detailed description give herebelow and from the accompanying drawings of the preferred embodiments of the invention, which, however, should not be taken to limit the invention but are for explanation only.

In the drawings.

DESCRIPTION OF THE PREFERRED EMBODIMENTS

Figure 1:
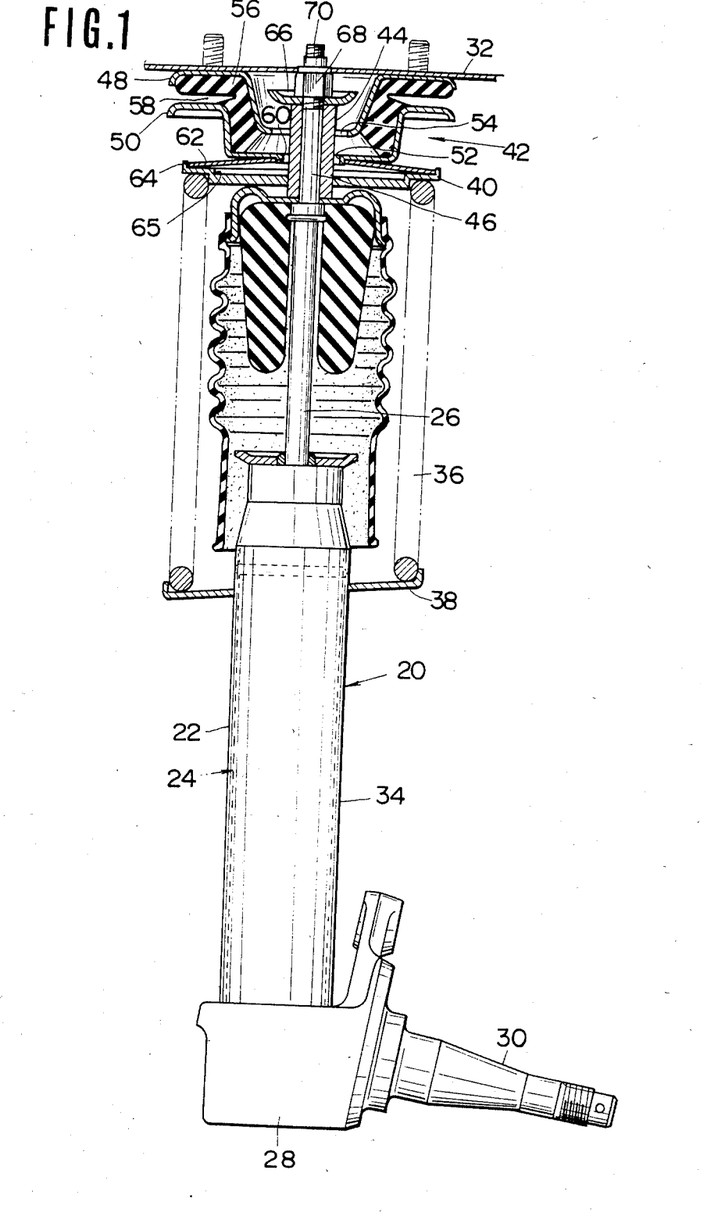
FIG. 1 shows a section of the first embodiment of strut assembly according to the present invention.
Figure 2:
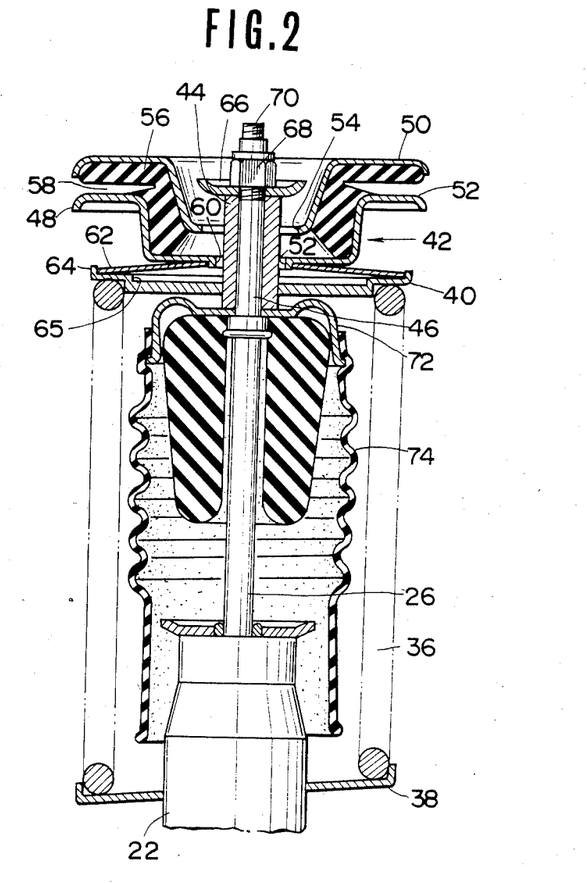
FIG. 2 is an enlarged view of the strut assembly of FIG. 1, showing the structure thereof in more detail.

Referring now to the drawings, particularly to FIGS. 1 and 2, a strut assembly 20 of the first embodiment of the invention comprises, in general, a cylindrical strut 22 and a shock absorber 24 with a piston rod 26. The lower end of the strut is connected to a knuckle 28 with a spindle 30 on which a wheel hub (not shown) can be mounted. On the other hand, the upper end of the piston rod 26 is secured to a strut housing 32 of a vehicle body. The piston rod 26 is rigidly connected to a reciprocating piston (not shown) in a shock absorber cylinder 34 for axial movement according to relative displacement between a wheel axle (the spindle 30) and the vehicle body (strut house 32).

A suspension coil spring 36 is wound around the strut 22 and seats onto a lower spring seat 38 rigidly secured to the outer periphery of the strut 22. The upper end of the suspension coil spring 36 is retained by an upper spring seat 40 which extends laterally from a damper assembly 42.

The damper assembly 42 generally includes a cylindrical bearing sleeve 44 extending around a stepped narrower-diameter section 46 of the piston rod 26. A pair of upper and lower brackets 48 and 50 respectively have central openings 52 and 54 through which the bearing sleeve 44 extends. A rubber damper 56 is interposed between the upper and lower brackets 48 and 50. The upper surface of the rubber damper 56 is rigidly secured onto the lower surface of the upper bracket 48 and the lower surface of the rubber damper 56 is rigidly secured onto the upper surface of the lower bracket 50. The rubber damper 56 is formed with a circumferentially extending groove 58.

Figure 3:
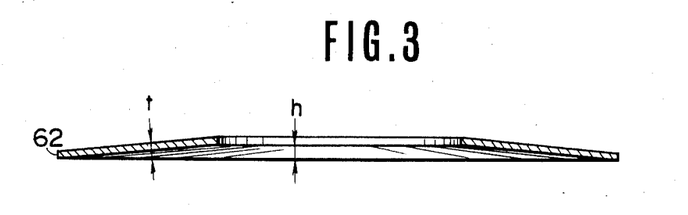
FIG. 3 is a cross-sectional view of a leaf spring employed in the strut assembly of FIG. 1, shown in the unloaded condition.

The lower bracket 50 has a flange 60 extending vertically from the circumferential edge of the central opening 54. A dish-shaped leaf spring 62 engages the inner circumference of the flange 60. The outer circumference of the leaf spring 62 engages a bent outer circumferential edge 64 of the upper spring seat 40. As shown in FIG. 3, the central portion of the leaf spring 62 is biased upwards so that its inner circumferential edge lies at a level higher than its outer circumferential edge by an amount h. In practice, the height h is in the range of 1.2 to 1.5 times greater than the thickness t of the leaf spring 62 in its unloaded state. The leaf spring 62, when mounted in the damper assembly and the vehicle, is adapted to be prestressed by a static load applied by the weight of the vehicle itself so that it is held nearly flat. This prestress is applied through the lower bracket 50 to which the vehicle weight is applied via the upper bracket 48 and the rubber damper 56.

The upper spring seat 40 has a substantially dish-shaped configuration, as best seen in FIG. 2, which defines a recess 65 which receives the inner portion of the leaf spring 62 when the latter is deformed downwardly.

The bearing sleeve 44 is secured to the section 46 of the piston rod 26 by means of a washer 66 and a fastener nut 68 which is engageable with a threaded portion 70 of the piston rod 26. The washer 66 also serves as a retainer for restricting the upward displacement of the damper assembly relative to the piston rod 26 in the piston compression stroke. A dust cover 72 with an elastic bellows-shaped member 74 is secured to the lower end of the bearing sleeve 44 to protect the upper end of the strut 22 from muddy water, dust and so forth.

When a vibration such as road shock is applied to the vehicle wheel, the vibration is transferred to the strut assembly 20 via the wheel spindle 30 so that the strut 22 vibrates in accordance with the original vibration. At the same time, the shock absorber cylinder 34 fixed to the internal periphery of the strut 22 vibrates with the strut. This vibration of the strut is transmitted to the upper spring seat 40 via the lower spring seat 38 and the suspension coil spring 36, since the lower spring seat 38 vibrates with the strut 22. The vibration of the upper spring seat 40 is transmitted to the leaf spring 62 and, in turn, to the rubber damper 56 via the lower bracket. Then, the vibration of the upper bracket 48 is transmitted to the vehicle body via the strut house 32.

On the other hand, the vibration applied to the shock absorber cylinder 34 is transmitted to the piston rod 26 via the piston in the shock absorber.

When magnitude of the vibration is relatively large, so that the washer 66 comes into contact with the upper bracket 48 or the dust cover 72 comes into contact with the upper spring seat 40, the shock absorber 24 produces a damping force to absorb the vibration. Therefore, the lower magnitude vibration is applied to the damper assembly 42 via the piston rod 26. At the same time, a similar damping force is generated by the suspension coil spring for absorbing vibration energy so that a lower magnitude vibration is transmitted to the damper assembly. Due to the transmission of the lower magnitude vibration from the piston rod 26 and the suspension coil spring 36, the damper assembly 42 vibrates. The leaf spring 62 is then deformed from its neutral, substantially flat position, resulting in an additional damping force. Similarly, the rubber damper 56 is elastically deformed and its rebound force serves as yet another damping force. Thus, the vibration magnitude is further reduced by the damping effect of the leaf spring and the rubber damper.

If the vibration applied is of substantially low amplitude so that the shock absorber 24 and the suspension coil spring 36 produce essentially no damping force, the shock absorber as an assembly of the shock absorber cylinder 34, the piston and the piston rod 26 may vibrate without performing any damping. Similarly, the suspension coil spring may vibrate so as to transmit the vibration at an amplitude substantially as applied to the vehicle to the damper assembly 42 via the upper spring seat 44. Due to this vibration, the leaf spring 62 is again deformed from its neutral flat condition to produce a damping force to absorb the vibration energy. Vibrational energy is also absorbed by the rubber damper 56 which is deformed in response to the applied vibration to produce a damping force.

Figure 4:
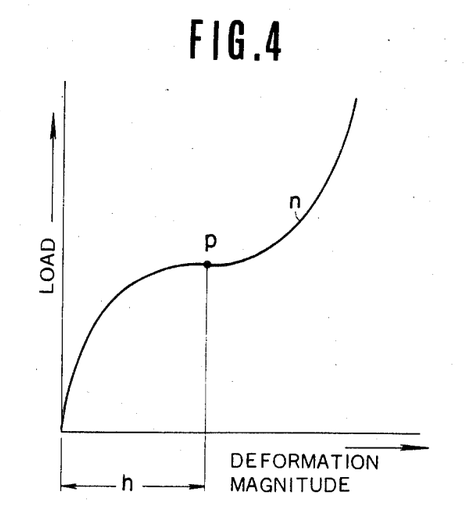
FIG. 4 shows the deformation characteristics of the leaf spring of FIG. 3 in terms of load applied thereto.

As shown in FIG. 4, the leaf spring 62 has a characteristic of deformation with respect to load in which the deformation rate is maximized at a point p which corresponds to the pre-loaded condition in which the central portion is deformed downward by an amount h so that the leaf spring is substantially flat. As can be appreciated from FIG. 4, the rigidity of the leaf spring 62 increases non-linearly with the load so as to produce a greater damping force at greater loads. Therefore, the leaf spring 62 is relatively flexible around its neutral position so that it readily absorbs vibrational energy by deformation. This characteristic is suitable for absorbing short-stroke, high-frequency vibrations applied to the wheel while the vehicle is moving.

Figure 5:
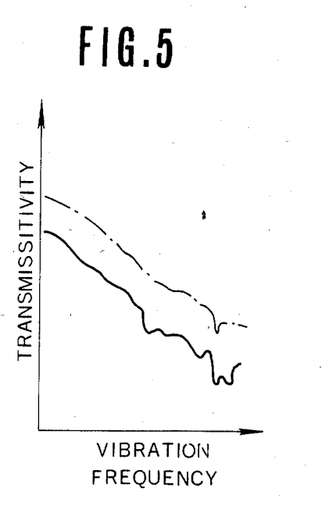
FIG. 5 shows the variation of vibration in relation to load, in which the solid curve represents the vibration variation in the strut assembly of FIG. 1 and the phantom curve represents the vibration variation in a typical conventional strut assembly.

This leaf spring 62 co-operates with the rubber damper to satisfactorily and successfully absorb vibrations. The effect of the shown embodiment is illustrated in FIG. 5 which shows experimentarily obtained values of overall strut vibration transmission with respect to vibration frequency. In FIG. 5, the phantom line represents vibration transmitted to the vehicle body by a conventional strut assembly having only a shock absorber, suspension coil spring and the rubber damper and the solid line represents vibration transmitted to the vehicle body via the shown embodiment of the strut assembly. As will be apparent herefrom vibration transmission via the strut assembly of the present invention is reduced by a significant amount. This improves riding comfort by reducing road noises and high-frequency vehicle body vibrations. Furthermore, according to the shown arrangement, the damping force to be created in response to substantially large-stroke shocks remains at a level sufficient to provide driving stability and cornering force.

Figures 6, 7:
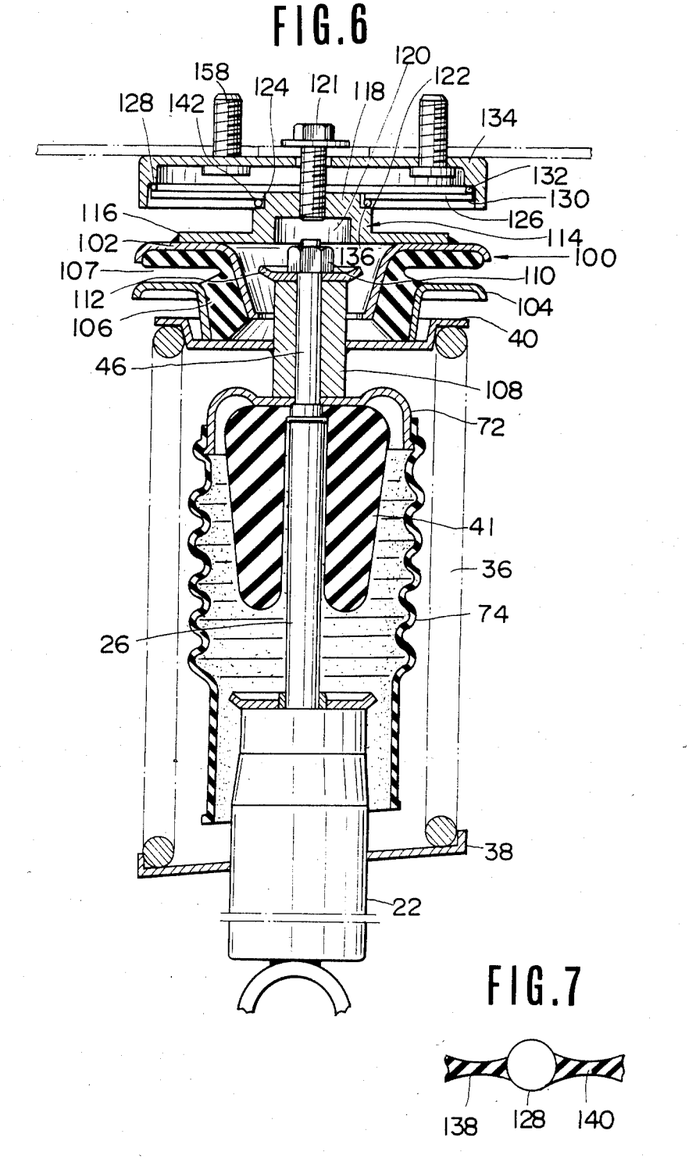
FIG. 6 is a view similar to FIG. 2 of the second embodiment of the strut assembly according to the present invention.
FIG. 7 is an enlarged cross-sectional view of a piano wire used in the strut assembly of FIG. 6.

FIG. 6 shows the second embodiment of the strut-type automotive suspension according to the present invention. In this embodiment, the piston rod 26 extending from the strut 22 engages a damper assembly 100. As in the foregoing first embodiment, the damper assembly 100 includes upper and lower brackets 102 and 104 enclosing a rubber damper 106. The rubber damper 106 is formed with a circumferentially extending groove 107 for added flexibility. The lower bracket 104 is secured to the upper spring seat 40. The upper spring seat 40 is, in turn, rigidly secured to a bearing sleeve 108 which is secured to the narrow diameter section 46 of the piston rod 26 by means of a fastener nut 110 and the washer 112.

A member 114, with an annular circumferential portion 116 and an upwardly recessed, cylindrical central portion 118 defining a rest 120 for receiving the end of the piston rod 26 with the fastener nut 110, is rigidly secured onto the upper surface of the upper bracket 102. A fastener bolt 121 engages a threaded opening 122 of the recessed central portion 118. The recessed central portion 118 also has a step 122 extending around its circular upper edge.

The inner circumferential edge 124 of an annular dish-shaped leaf spring 126 is mounted on the step 122 of the member 114 via a ring of piano wire 128. The outer circumferential edge 130 of the leaf spring 126 engages a circumferentially extending step 132 formed in a bracket 134 from which fastener bolts (not shown) extend upwardly to engage the strut house of the vehicle body. A ring of piano wire 128 is also inserted between the outer circumferential edge 130 of the leaf spring 126 and the mating surface 136 of the step 122 of the member 114. The piano wires 128 are provided to reduce the mechanical friction between the leaf spring 126 and the mating surfaces. As shown in FIG. 7, each piano wire 128 has a pair of elastic sealing lips 138 and 140 extending from its opposite coplanar edges. The free edges of the sealing lips 138 are adapted to contact the corresponding edges of the leaf spring 126 and the free edges of the sealing lips 140 are adapted to contact the mating surface of the step 122 or 132. Thus, the sealing lips 138 and 140 and the piano wire 128 establish sealing contact with their mating surfaces in order to retain lubricating oil in the spaces 142 defined between the brackets 134 and 114 and the leaf spring 126.

As in the foregoing first embodiment, the suspension coil spring 36 is wound around the strut 22 and seated to the upper and lower spring seats 40 and 38. The dust cover 72 with the elastic bellows-shaped member 74 is secured to the lower end of the bearing sleeve in order to protect the upper end portion of the strut from muddy water, dust and so forth. An rubber insulator 41 is secured to the lower surface of the dust cover 72 and surrounds the piston rod. The rubber insulator serves as a damper for preventing the top of the strut from colliding with the dust cover.

As in the foregoing first embodiment, relatively large-amplitude vibrations from the road wheel are absorbed by the shock absorber in the strut and the suspension coil spring. On the other hand, relatively low-amplitude, high-frequency vibrations from the road wheel are transmitted to the damper assembly 100 via the strut 22, the suspension coil spring 36 and the upper spring seat 40. The vibration energy of the relatively high-frequency, low-amplitude vibrations is first absorbed by the rubber damper 106 due to deformation of the latter. The vibration energy is further absorbed by the leaf spring 126 due to deformation of the latter in accordance with the applied vibration.

The leaf spring 126 is pre-loaded to be held substantially flat. The leaf spring 126 has the same damping characteristics as illustrated in FIG. 4, by which deformation magnitude increases in accordance with increases in load. Thus, a shock absorbing effect similar to that achieved by the foregoing first embodiment can be provided by the shown second embodiment.

FIGS. 8 to 11 show a modification of the foregoing second embodiment of the strut-type suspension. In this modification, the leaf spring 126 is formed with cutouts 150 and 152 in its inner and outer circumferential edges respectively. The cutout 150 on the inner circumferential edge of the leaf spring 126 is engageable with a positioning pin 154 protruding from the central portion 118 of the member 114. On the other hand, the cutout 152 on the outer circumferential edge of the leaf spring 126 is engageable with a positioning pin 156 protruding from the bracket 134. Due to engagement of the cutouts and the positioning pins, the member 114, the bracket 134 and the leaf spring 126 are held in a specific angular relationship with respect to one another.

Figure 8:
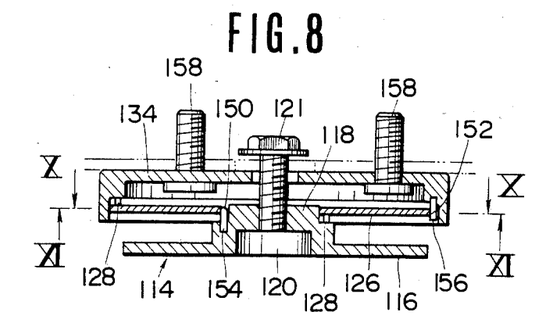
FIG. 8 is a cross-sectional view of a modification of the second embodiment of strut assembly.

As set forth previously, the bracket has fastener bolts 158 extending therefrom which rigidly secure the strut assembly to the strut house of the vehicle body. The specific angular relationship between the member 114, the bracket 134 and the leaf spring 126 serves to position the fastener bolts 158 in alignment with the through openings in order to facilitate engagement of the fastener bolts 158 with the through openings (not shown) in the strut house.

Figures 9, 10, 11:
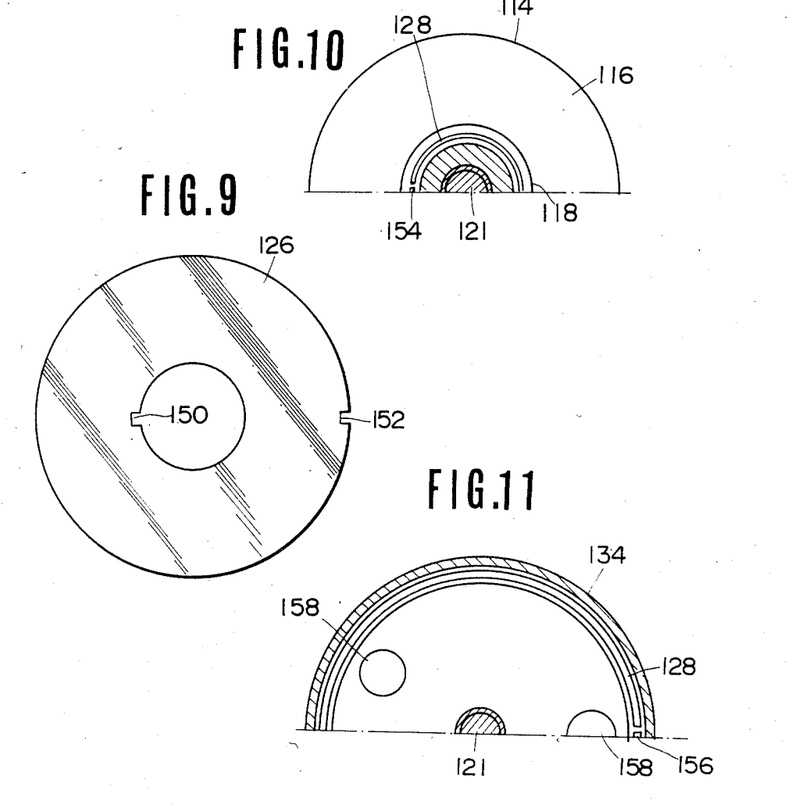
FIG. 9 is a plan view of the leaf spring used in the modification of FIG. 8.
FIG. 10 shows a section taken along line X—X of FIG. 8.
FIG. 11 shows a section taken along line XI—XI of FIG. 8.

In this modification, the piano wires 128 inserted between the circumferential edges of the leaf spring and the mating surfaces of the member 114 and the bracket 134 are cut at point corresponding to the cutouts 150 and 152 respectively to allow cutout-and-pin engagement, as shown in FIGS. 10 and 11.

It will be appreciated that the arrangement of the cutout and the positioning pin for positioning the bracket 134 with respect to the leaf spring 126 and the member 114 can be modified in various ways. For example, the positioning pin can be replaced with a key projecting from the bracket and the member 114 at points corresponding to the cutouts. In another example, the cutout may be formed in the bracket 134 and the member 114 with the positioning pins or keys provided in the leaf spring.

Figures 12, 13, 14:
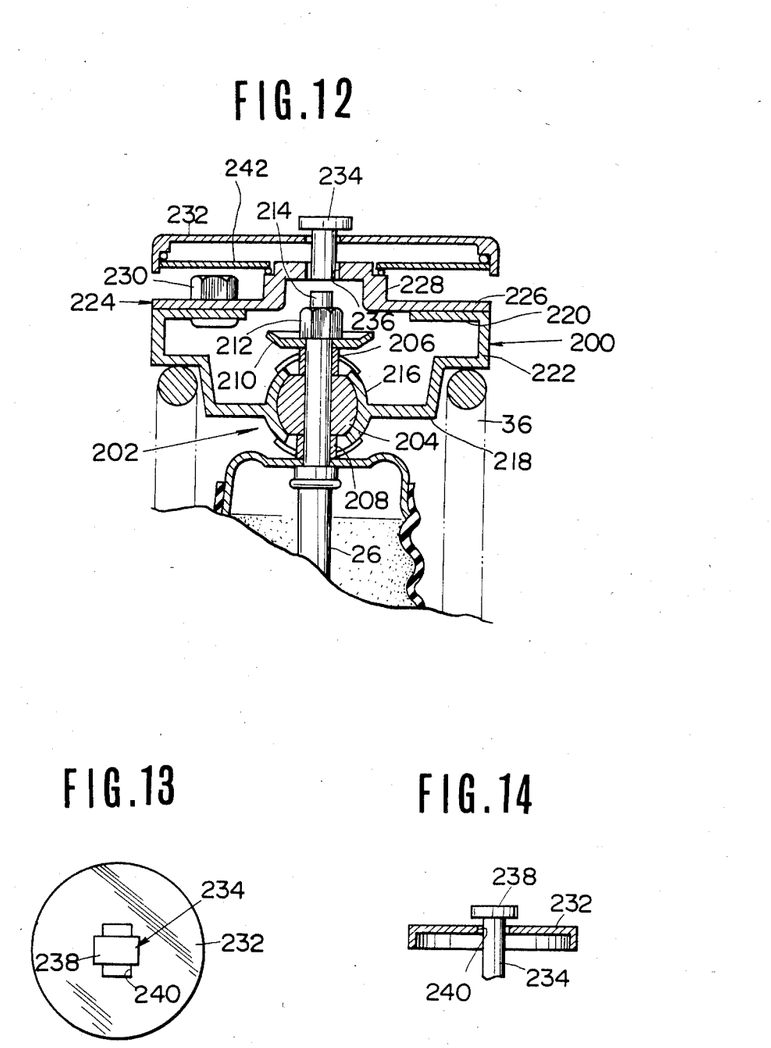
FIG. 12 shows a section of the major part of the third embodiment of the strut assembly according to the present invention.
FIG. 13 is a plan view of a bracket in the third embodiment of FIG. 12.
FIG. 14 shows a fragmentary section of the bracket of FIG. 13 as engaged with a connector bolt.

Referring to FIG. 12, the third embodiment of the strut-type suspension includes a pillow block assembly 202 in a damper assembly 200. A pillow ball 204 in the pillow block assembly 202 is attached to the piston rod 26 of the shock absorber extending from the strut. The pillow ball 204 is axially positioned along the piston rod 26 by means of bearing sleeves 206 and 208, a washer 210 and fastener nut 212 which engages a threaded end 214 of the piston rod 26. A pillow block 216 rotatably engages the pillow ball. The pillow block 216 has a lateral extension which includes a portion 218 serving as an upper spring seat for the suspension coil spring 36. An inwardly bent flange portion 220 extends from the upper spring seat portion 218 via a vertical portion 222. A member 224 with an annular outer circumferential portion 226 and an upwardly recessed, cylindrical, central portion 228 is secured to the flange portion 220 of the pillow block 216 by fastener bolts 230, at the circumferential portion 226. The member 224 is attached to a bracket 232 from which fastener bolts for securing the strut assembly to the strut house of the vehicle body extend, by means of a connector bolt 234 engageable with a threaded opening 236 in the central portion 228.

As shown in FIGS. 13 and 14, the connector bolt 234 has a rectangular head 238. The bracket 232 has a rectangular opening 240 through which the connector bolt 234 engages the threaded opening 236. The connector bolt 234 is screwed into the threaded opening 240 prior to attaching the bracket 232 to the member 224. The rectangular opening 240 is of a size corresponding to the rectangular head 238 of the connector bolt 234 to allow the latter to pass therethrough. Thereafter, either the bracket or the member 234 is rotated relative to the other the align the longer axis of the rectangular head 238 perpendicular to the longer axis of the rectangular opening. In this way, the bracket and the member 234 are secured to one another.

In this structure of the third embodiment, vibrations from the road wheel are transmitted to the strut and to the suspension coil spring. The vibration of the piston of the shock absorber is then transmitted to the pillow block 216 via the piston rod 26. In turn, the vibration of the strut is also transmitted to the pillow block 216 via the suspension coil spring 36.

When the magnitude of vibration is large enough for the shock absorber and the suspension coil spring 36 to produce a damping force, the vibration is damped by the shock absorber and the suspension coil spring. On the other hand, if the magnitude of vibration is relatively small and the frequency thereof is relatively high, the leaf spring 242 becomes effective to absorb the vibration as in the foregoing first and second embodiments. Furthermore, in this construction, the pillow block assembly 204 effectively absorbs rotational or swinging movement of the suspension strut so that riding comfort is ensured even when the strut assembly sways.

Thus, as set forth above, according to the present invention, relatively high-frequency, low-amplitude vibrations which cause road noise and so forth can be successfully and satisfactorily absorbed by the leaf spring provided in the strut assembly.

What is claimed is:

1. A strut suspension for an automotive vehicle comprising:
   a cylindrical strut operatively connected to a vehicle road wheel for movement therewith;
   shock absorber means disposed within said strut;
   a piston rod having an upper end extending from said shock absorber means and said strut, said piston rod adapted to be displaced relative to said strut in accordance with vibration applied thereto;
   damping means for mounting the upper end of said piston rod to a vehicle body;
   a suspension coil spring interposed between said suspension strut and said vehicle body for producing a damping force for damping relative displacement between said suspension strut and said vehicle body, said suspension coil spring being seated on an upper and a lower spring seat, said lower spring seat being fixed to the outer periphery of said suspension strut;
   said shock absorber means and said coil spring producing damping force for damping relatively low-frequency, high-amplitude vibrations applied thereto to be transmitted to the vehicle body;
   said damping mounting means being interposed between said upper spring seat and said vehicle body and including a disc spring adapted to deflect for damping high-frequency, low-amplitude vibrations and for producing a damping force which increases non-linearly with increases in magnitude of vibrations to be transmitted from said suspension coil spring to said vehicle body through said upper spring seat.

2. The strut suspension as set forth in claim 1 wherein said disc spring is pre-loaded upon assembly in the vehicle so that it is held substantially flat in the absence of vibrations.

3. The strut suspension as set forth in claim 2 wherein said disc spring exhibits low rigidity in response to low-amplitude, high-frequency vibrations and relatively high rigidity in response to higher-amplitude vibrations.

4. The strut suspension as set forth in claim 1 wherein said damping mounting means includes a damper assembly connecting said piston rod to said vehicle body for absorbing relative displacement between said piston rod and said vehicle body.

5. The strut suspension as set forth in claim 4 wherein said damper assembly incorporates an upper bracket secured to said vehicle body and a lower bracket engaged by said disc spring, and an elastic damper between said brackets for absorbing relatively high-frequency, low-amplitude vibrations.

6. The strut suspension as set forth in claim 5 wherein said disc spring is between said piston rod and said bracket.

7. The strut suspension as set forth in claim 4 wherein said damper assembly includes a pillow block assembly associated with said piston rod for accommodating relative displacement between said piston rod and said vehicle body.

8. The strut suspension as set forth in claim 4 wherein said disc spring is disc-shaped and pre-loaded upon assembly in the vehicle an that it is held substantially flat in the absence of vibrations.

9. The strut suspension as set forth in claim 8 wherein said disc spring exhibits low rigidity in response to said low-amplitide, high-frequency vibrations and said disc spring exhibits relatively high rigidity in response to higher-amplitude vibrations.

10. The strut suspension as set forth in claim 9 wherein said damper assembly incorporates an upper bracket secured to said vehicle body, a lower bracket engaged by said disc spring, and an elastic damper between said brackets for damping relatively high-frequency, low-amplitude vibrations applied thereto.

11. The strut suspension as set forth in claim 10 wherein said disc spring is between said piston rod and said lower bracket.

12. The strut suspension as set forth in claim 9 wherein said damper assembly includes a pillow block assembly associated with said piston rod for accommodating relative displacement between said piston rod and said vehicle body.

13. A strut assembly for an automotive vehicle suspension comprising:
   a cylindrical strut operatively connected to a vehicle road wheel for movement therewith;
   shock absorber means disposed within said strut including a piston rod movable relative to said strut and having an upper end extending from said strut;
   a suspension coil spring seated on an upper and a lower spring seat, said lower spring seat being secured to said strut and said upper spring seat being secured to the upper end of said piston rod for movement therewith; and a resilient damper means interposed between said upper spring seat and a vehicle body for absorbing relative displacement therebetween, said damper means producing a relatively small damping force in response to relatively high-frequency, low-amplitude vibrations transmitted from said suspension coil spring to said vehicle body through said upper spring seat and producing a relatively large damping force in response to vibrations having an amplitude beyond a predetermined value.

14. The strut assembly as set forth in claim 13 wherein the rigidity of said disc spring of said damper means varies nonlinearly with the amplitude of applied vibrations and the rigidity thereof remains at an approximately constant low level in response to vibrations having a lower amplitude than said predetermined value.

15. The strut assembly as set forth in claim 14 wherein said resilient damper means includes an elastic damper which is co-operative with said disc spring to absorb relatively high-frequency, low-amplitude vibrations.

* * * * *